US005639154A

United States Patent [19]

Kusagaya et al.

[11] Patent Number: 5,639,154

[45] Date of Patent: Jun. 17, 1997

[54] LIGHTING FIXTURE FOR AUTOMOBILE USE

[75] Inventors: Masahiro Kusagaya; Masataka Choji; Yasuo Ozawa, all of Shizuoka, Japan

[73] Assignee: Koito Manufacturing Co., Ltd., Tokyo, Japan

[21] Appl. No.: 571,275

[22] Filed: Dec. 12, 1995

[30] Foreign Application Priority Data

| | | | |
|---|---|---|---|
| Dec. 13, 1994 | [JP] | Japan | 6-332240 |
| Oct. 18, 1995 | [JP] | Japan | 7-293769 |

[51] Int. Cl.$^6$ .......... B60Q 1/00; F21V 29/00

[52] U.S. Cl. .......... 362/61; 362/294; 362/345; 362/226

[58] Field of Search .......... 362/61, 80, 226, 362/310, 374, 375, 373, 294, 267

[56] References Cited

U.S. PATENT DOCUMENTS

| | | | |
|---|---|---|---|
| 4,893,218 | 1/1990 | Dilk et al. | 362/61 |
| 5,010,455 | 4/1991 | Luallin et al. | 362/226 |
| 5,457,616 | 10/1995 | Grigorescu et al. | 362/61 |

*Primary Examiner*—Stephen F. Husar
*Assistant Examiner*—Thomas M. Sember
*Attorney, Agent, or Firm*—Morgan, Lewis and Bockius LLP

[57] ABSTRACT

A lighting fixture for automobile use that includes a cylindrical surrounding wall arranged around an electric bulb at the rear of the lamp body, the cylindrical surrounding wall being engaged with the socket cover and having a plurality of slits arranged along an inner ledge or outer edge of the surrounding wall. The lighting fixture further including a plurality of engaging edges protruding from a body engaging portion formed on the socket cover, and a plurality of engaging claws formed in the body engaging portion.

16 Claims, 9 Drawing Sheets

LIGHTING FIXTURE FOR AUTOMOBILE USE

BACKGROUND OF THE INVENTION

1. Field of the Invention

The present invention relates to an automobile lighting fixture, and more particularly, to an automobile lighting fixture having a lamp body that can be more easily and inexpensively manufactured.

2. Description of the Related Art

Conventional automobile lighting fixtures include a socket cover attached to the rear of a lamp body, similar to the lamp depicted in FIG. 14, and a cylindrical support cylinder "b" protruding from the rear face of a lamp body "a". In addition, the support cylinder "b" is engaged with a socket cover "c", which is attached to the outer circumferential surface of support cylinder "b". Conventional automobile lighting fixtures also include an annular engaging groove "d" on the outer circumferential surface of the support cylinder "b" and a protrusion "e" on the socket cover "c". Protrusion "e" engages with engaging groove "d" to prevent the socket cover "c" from being easily disconnected from support cylinder "b".

To manufacture the known structure described above, the engaging groove "d" is formed by means of cutting work, resulting in significant manufacturing costs.

SUMMARY OF THE INVENTION

Accordingly, an object of the present invention is to provide for the simple manufacture of a lamp body having lesser manufacturing costs than required by the prior art.

To achieve these and other advantages and in accordance with the purpose of the invention, as embodied and broadly described, the invention provides for a lighting fixture fox automobile use comprising, a lamp body having a front face and a rear portion, a lens connected to the lamp body for covering the front face of the lamp body, an electric bulb attached to the rear portion of the lamp body to provide a source of light, a socket cover attached to the rear portion of the lamp body, a surrounding wall located proximate to the rear portion of the lamp body, the surrounding wall being engaged with the socket cover and including a plurality of slits arranged along an edge of the surrounding wall, engaging edges protruding from the rear portion of the lamp body, the engaging edges having positions and dimensions that correspond to the plurality of slits to allow the engaging edges to be formed simultaneously with the molding of the lamp body, a surrounding wall for an automobile lighting fixture lamp body, comprising, an inner and outer edge portion, a plurality of slits arranged along either edge portion of the surrounding wall, a rear end portion, a plurality of engaging edges protruding from the rear end portion, the engaging edges having positions and dimensions that correspond to those of the slits to allow the engaging edges to be formed simultaneously with the molding of the lamp body.

The present invention enables the manufacture of automobile lighting fixtures, wherein the engaging edge is formed during formation of the lamp body, without requiring a specific separate process for attaching the socket cover to the lamp body. This process results in reduced manufacturing costs as compared to processes employed prior to the present invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate one embodiment of the invention and together with the written description serve to explain the principles of the invention. In the drawings.

Figure 6:
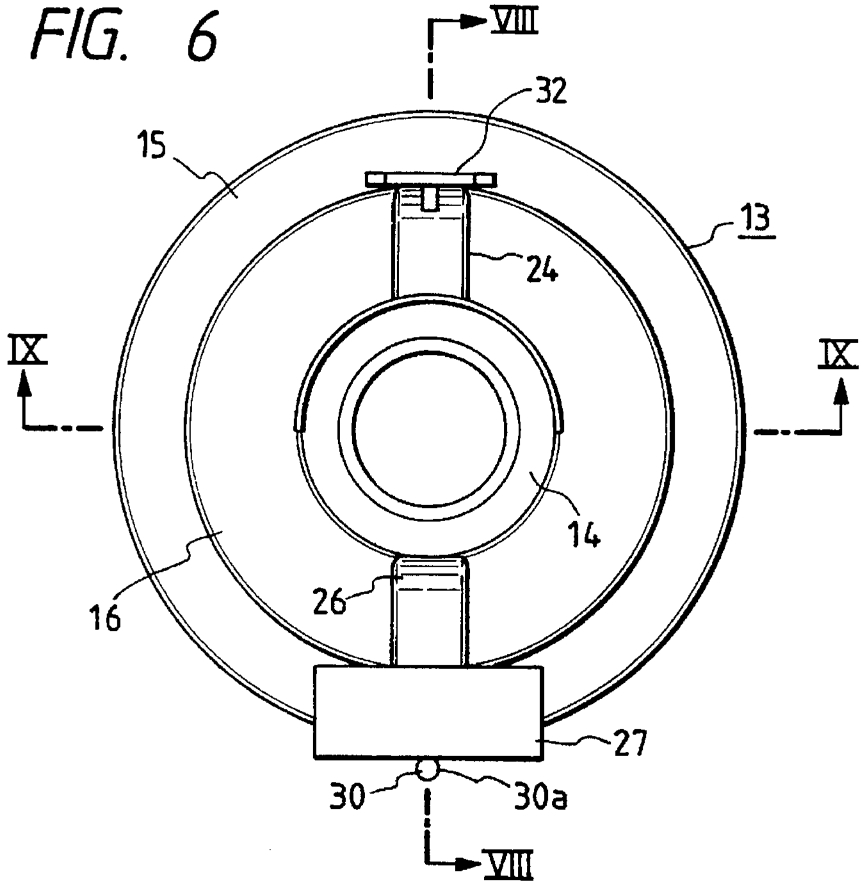
FIG. 6 is a rear view of the socket cover.
Figure 7:
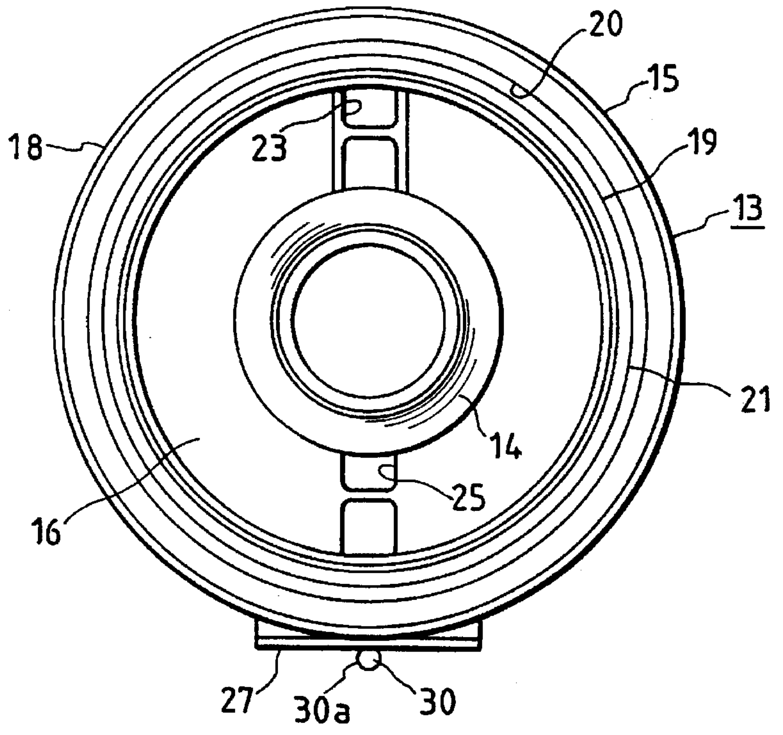
FIG. 7 is a front view of the device according to present invention.
Figure 8:
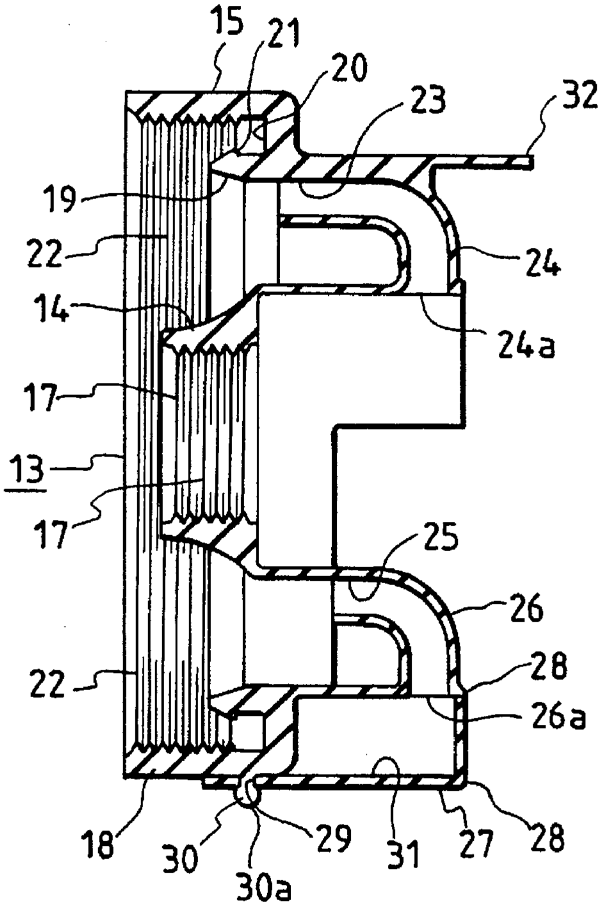
FIG. 8 is a cross-sectional view taken on line VIII—VIII of FIG. 6.
Figure 9:
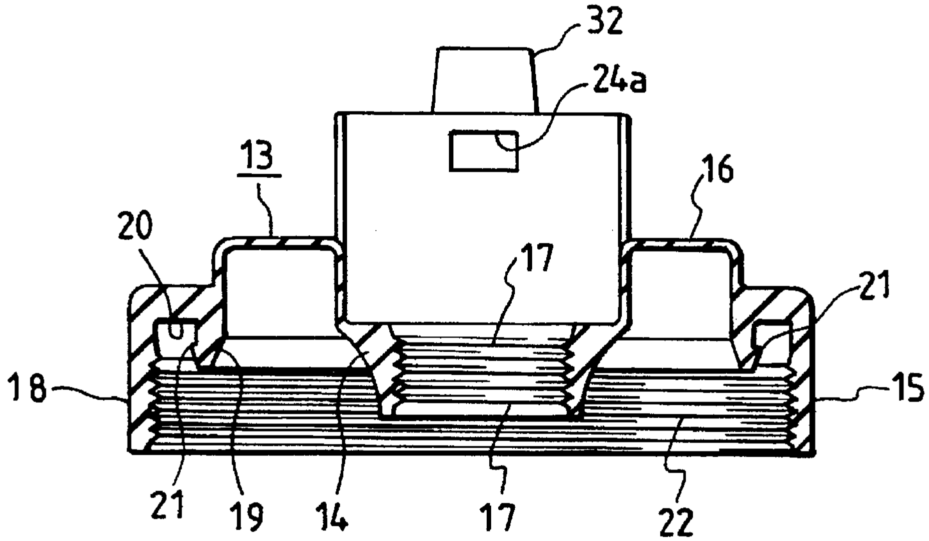
Figure 10:
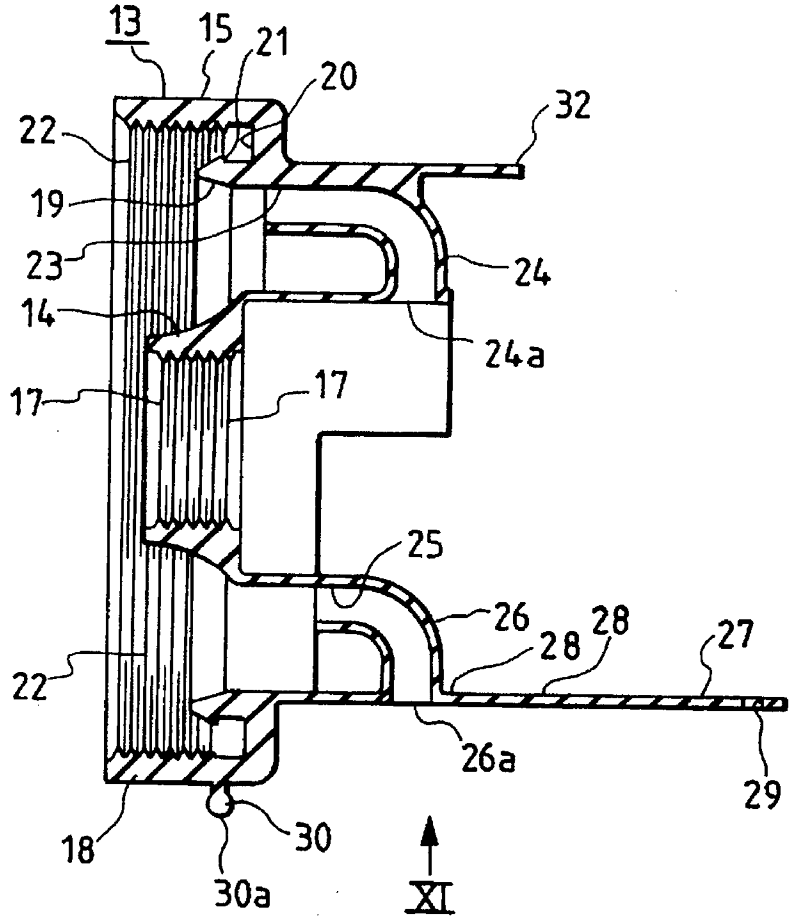
Figure 11:
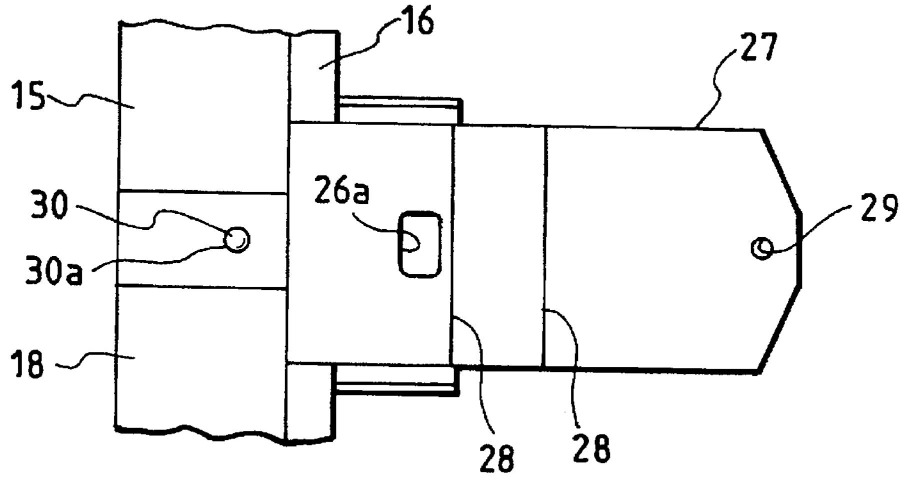
Figure 12:
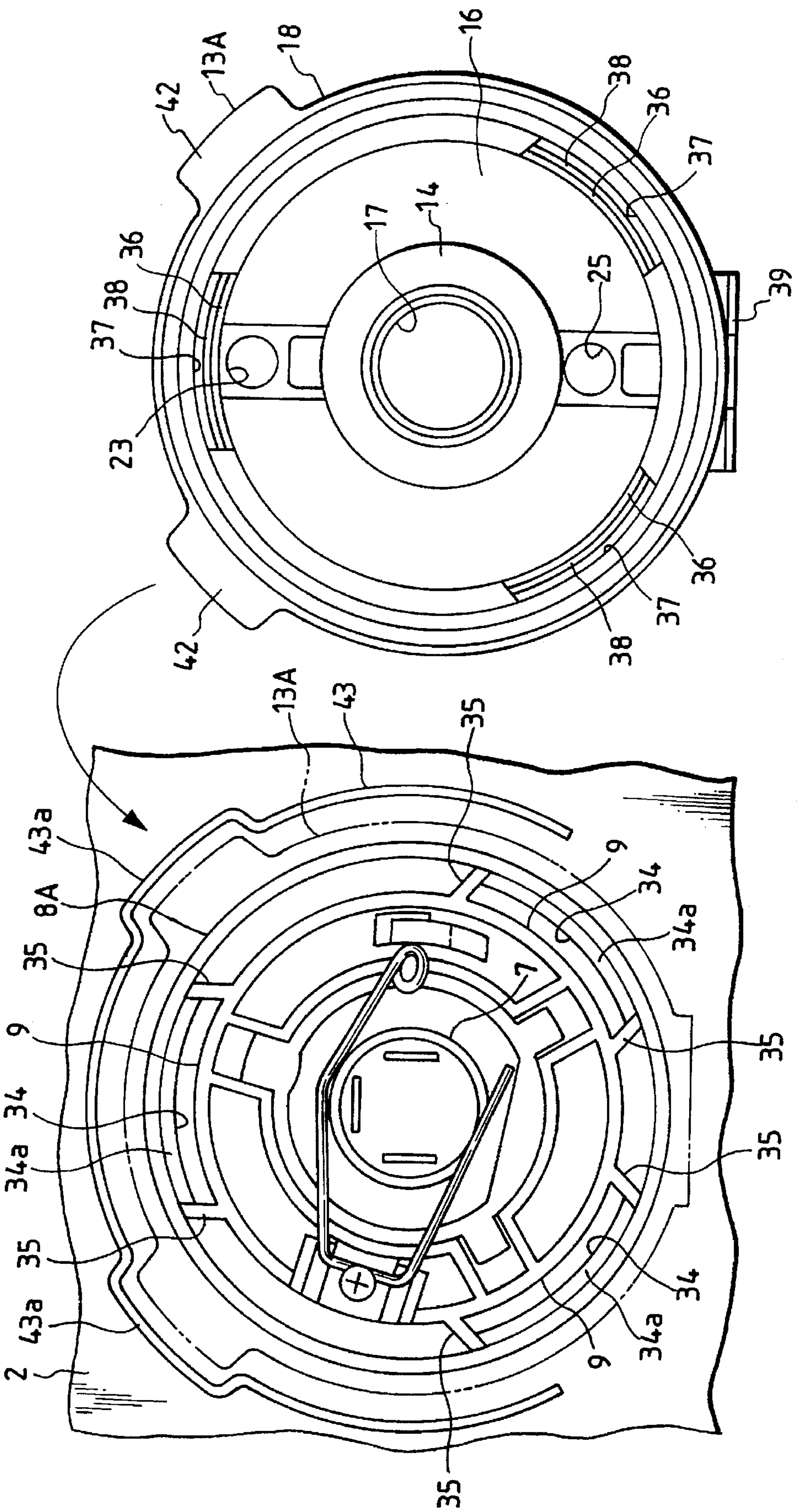
Figure 13:
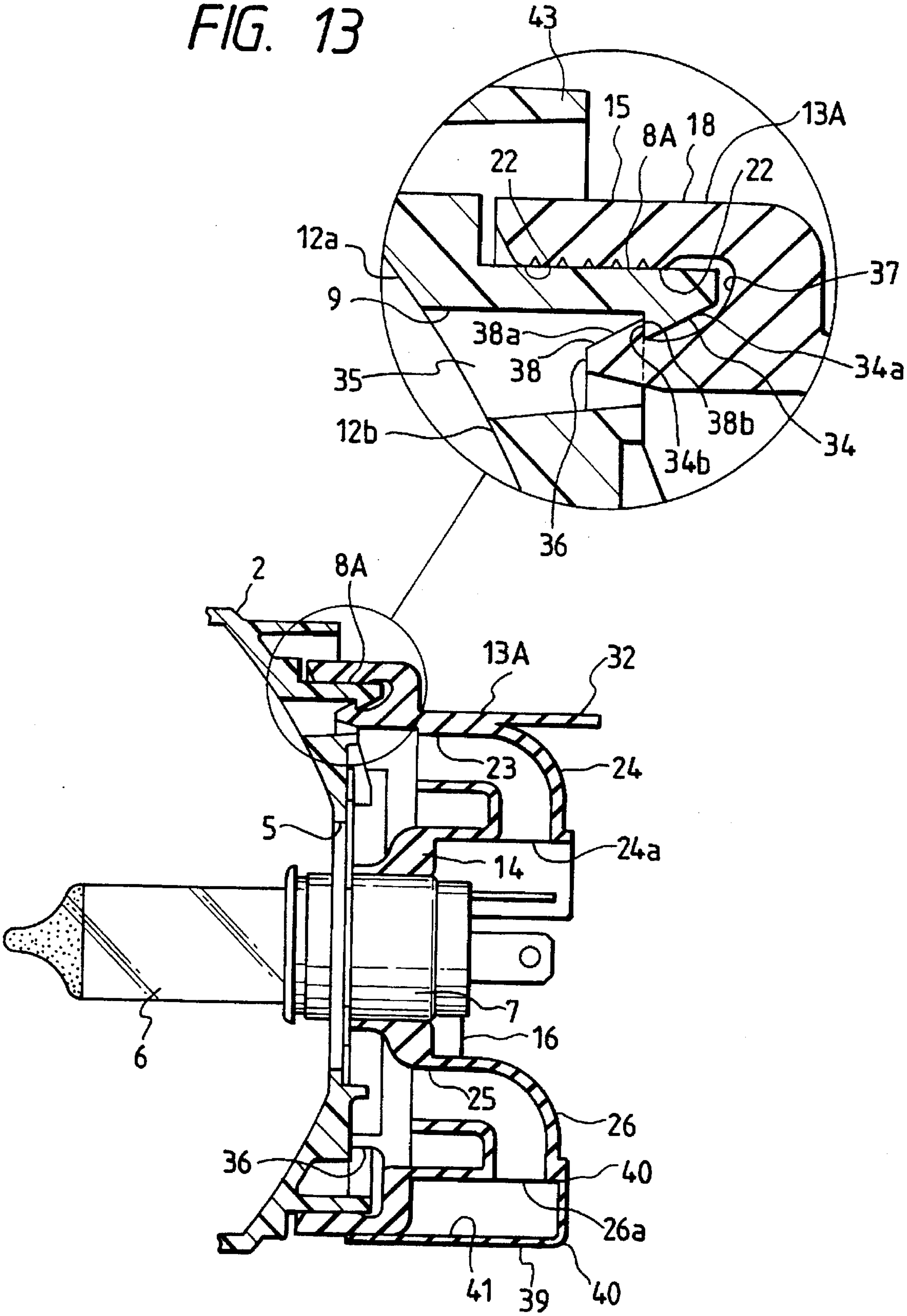
Figure 14:
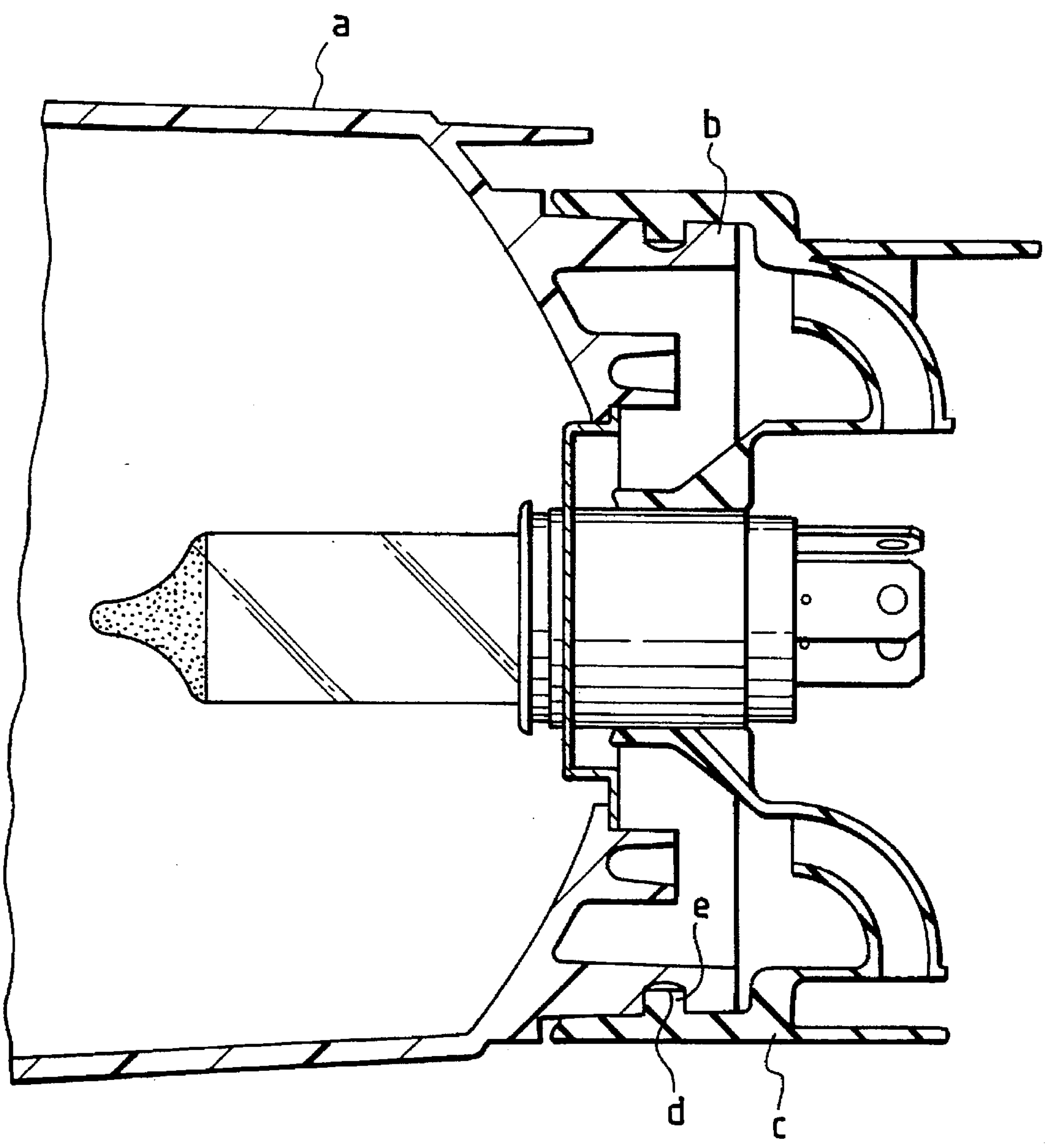

Fig, 9 is a cross-sectional view taken on line IX—IX of FIG. 6;

FIG. 10 is a cross-sectional view of the socket cover taken on the same section as that of FIG. 8 before the wind guide path is formed;

Fig, 11 is a view taken in the direction of arrow XI of FIG. 10;

FIG. 12 is a view showing a second embodiment of the present invention, in which the socket cover is attached to the lamp body;

FIG. 13 is a longitudinal cross-sectional view in which the socket cover is attached to the lamp body; and FIG. 14 is a cross-sectional view of the device according to the present invention.

DETAILED DESCRIPTION OF THE PREFERRED EMBODIMENTS

Reference will now be made in detail no the present preferred embodiment of the invention, an example of which is illustrated in the accompanying drawings.

The preferred embodiment of the lighting fixture for automobile use is shown in FIGS. 1 to 11. The head lamp of the present invention has a lamp body 2 which is preferably molded of synthetic resin and includes a recess 3 that is open toward the front. The inner surface of the recess 3 is a reflecting surface. A lens 4 is attached to the lamp body 2 such that the lens 4 covers a front opening of the lamp body. An electric bulb mounting hole 5 is formed at the rear center of the lamp body 2, and a light source bulb 6 is detachably fixed to the electric bulb mounting hole 5. Light source bulb 6 has a base 7.

A short cylindrical surrounding wall 8, which protrudes backward, extends around the electric bulb mounting hole 5 on the back face of the lamp body 2.

In addition, the preferred embodiment of the present invention includes a plurality of slits 9, which are narrow and arranged at intermittent positions along an edge of the surrounding wall 8. One of the slits 9 is located directly above the center of the lighting fixture, while two of the slits 9 are located at diagonally lower positions with respect to the center of the lighting fixture.

Figure 1:
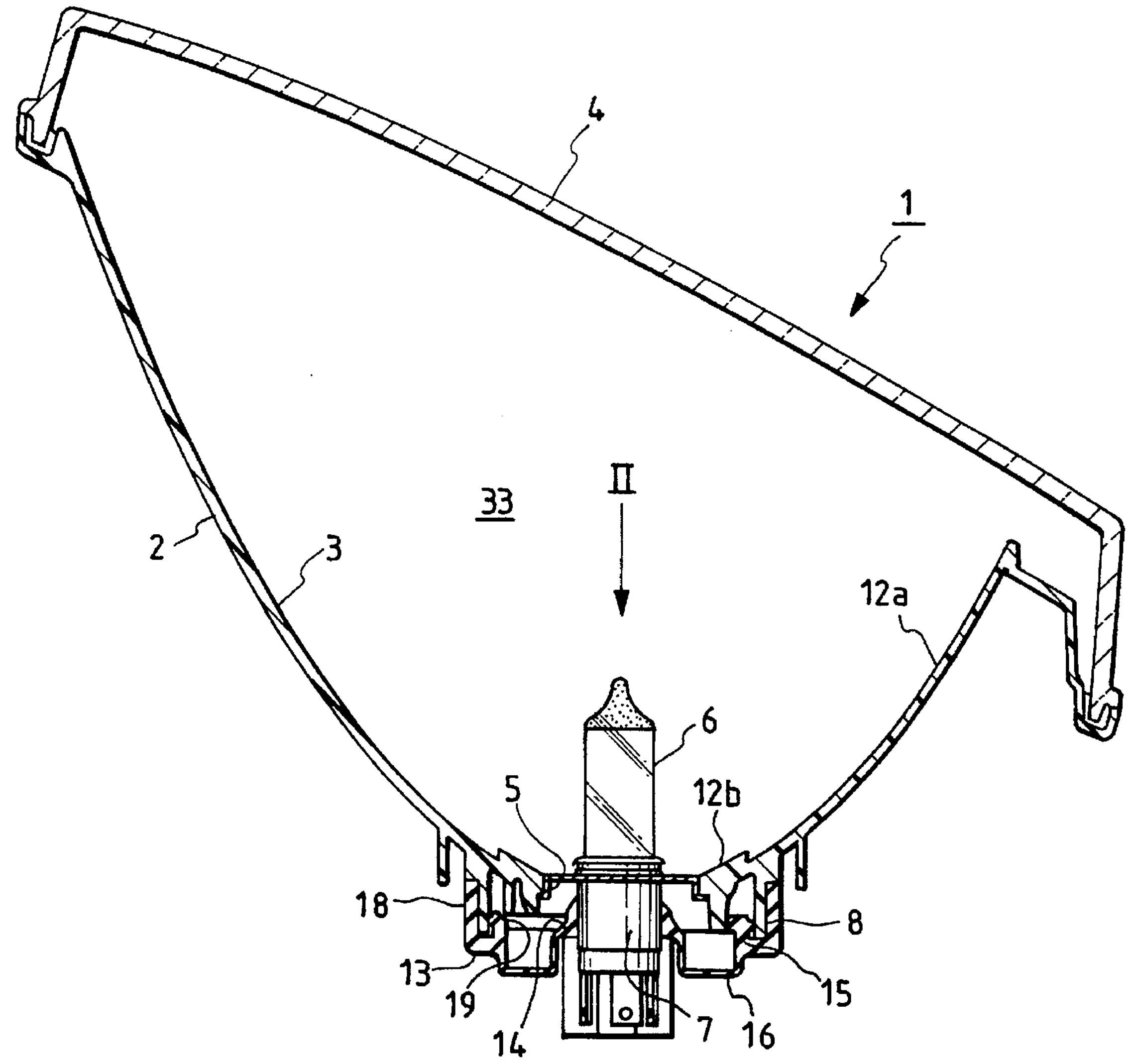
FIG. 1 is a transverse sectional view of the first embodiment of the present invention directed to a lighting fixture for automobile use.
Figure 3:
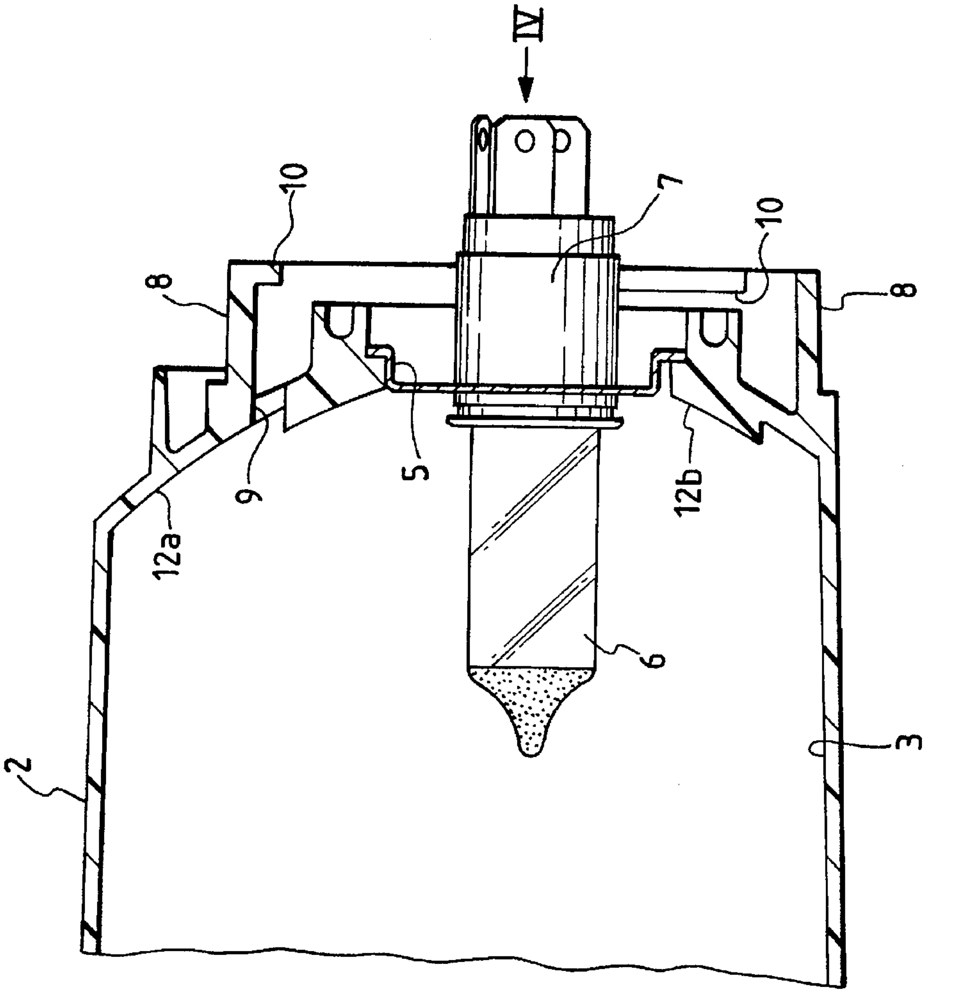
FIG. 3 is an enlarged cross-sectional view taken on line III—III of FIG. 2, wherein the socket cover is removed from the lighting fixture.
Figure 2:
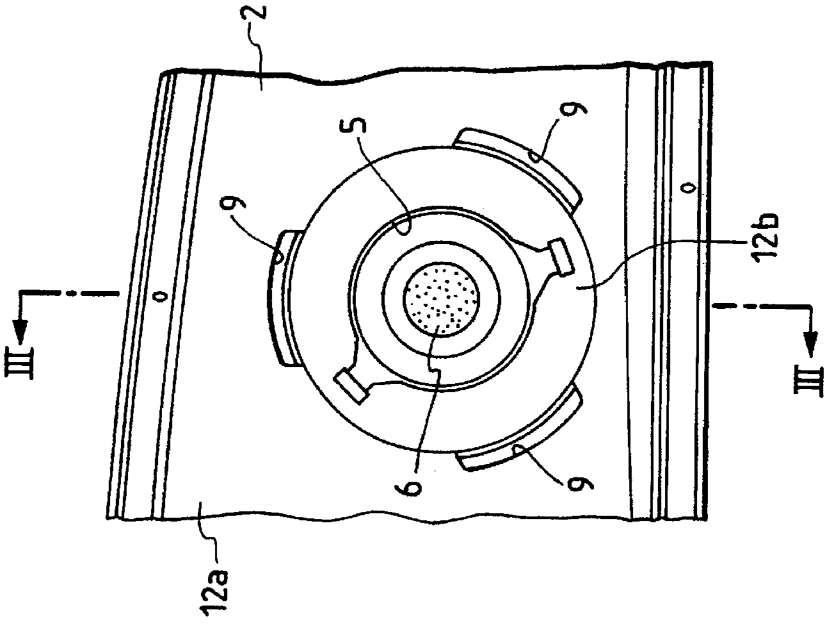
FIG. 2 is a view taken in the direction of arrow II in FIG. 1.
Figure 5:
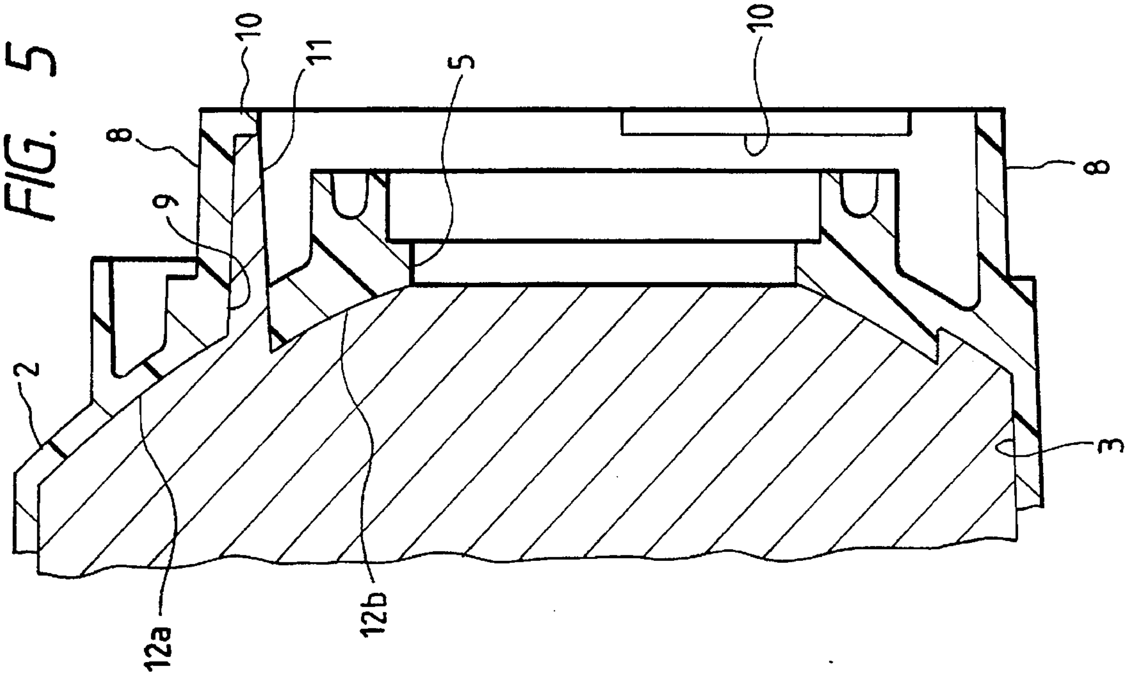
FIG. 5 is an enlarged cross-sectional view of the primary portion of the lamp body during the molding process.
Figure 4:
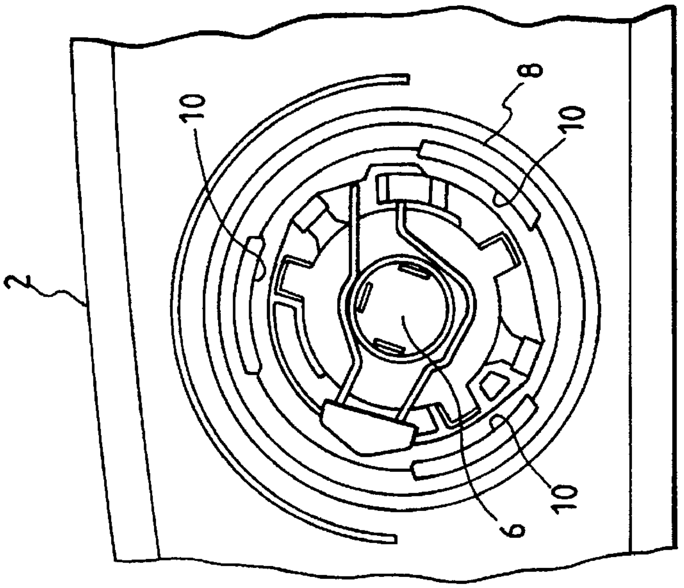
FIG. 4 is a view taken in the direction of arrow IV of FIG. 3.

Engaging edge 10 protrudes inwardly from a rear end of the surrounding wall 8, and is formed such that the position of the engaging edges correspond to the edge of the slits 9. In addition, the dimensions of the engaging edges are the same as those of the slits 9. As shown in FIG. 5, when the lamp body 2 is molded, portion 11 of the metallic mold arranged inside the lamp body 2 is inserted through the slits 9 and inside the engaging edges 10. Accordingly, the engaging edges 10, which attach the socket cover to the lamp body 2, can be formed simultaneously during the molding of the lamp body 2.

The reflecting surface is preferably composed of two different paraboloid sections. That is, the outer portion 12*a*, with respect to a circle on which the slits are located, is different from the inner portion 12*b* in that the focal distance of the inner portion 12*b* is shorter than that of the outer portion 12*a*.

Reference numeral 13 is a socket cover preferably formed from an elastic material, such as natural or synthetic rubber. The socket cover 13 is formed into a short cylinder in the same manner as the short cylindrical electric bulb engaging portion 14. A body engaging portion 15, the diameter of which is larger than that of the electric bulb engaging portion 14, is integrated with the electric bulb engaging portion 14 by a back wall 16.

As described above, the electric bulb engaging portion 14 is formed into a short cylinder. The inner surface of the electric bulb engaging portion 14 includes a large number of annular protrusions 17.

The body engaging portion 15 is also formed into a short cylinder. The body engaging portion 15 includes an outer circumferential wall 18 and an inner circumferential wall 19 which are connected with each other at the rear end. The length of the inner circumferential wall 19 is approximately half of the length of the outer circumferential wall 16. Between the two circumferential walls 18, 19 is an engaging groove 20, which is open to the front. At the front end of the inner circumferential wall 19 is an engaging claw 21 which protrudes toward the outer circumferential wall 18, A large number of annular protrusions 22 are formed on the inner circumferential surface of the outer circumferential wall 18. The back wall 16 includes a transverse section having a C-shape that is open to the front. An outer end of the back wall 16 is connected with an inner edge of the rear end of the body engaging portion 15, while an inner end of the back wall 16 is connected with an outer edge of the rear end of the electric bulb engaging portion 14.

A venthole 23, which functions as an exhaust hole, is formed directly above the electric bulb engaging portion 14 and on the back wall 16. Ventilation pipe 24 has an axial section that is approximately L-shaped, and an outer opening 24*a* directed downward. An inner end of the ventilation pipe 24 is connected to the exhaust hole 23, venthole 25 functions as a suction hole. Ventilation pipe 26 has an axial section which is approximately L-shaped, and an outer opening 26*a* that is directed downward. An inner end of the ventilation pipe 26 is connected to suction hole 25.

Baffle plate 27 extends in the longitudinal direction and protrudes backward from the back face of the body engaging portion 15 at a position corresponding to the outer opening 26*a* of the ventilation pipe 26. The width of the baffle plate 27 is approximately 3 times greater than that of the ventilation pipe 26. Baffle plate 27 includes two thin wall portions 28, which cross at a first position located at where the baffle plate 27 comes into contact with the back face of the ventilation pipe 26, and at a second position located behind the above described position. The distance between the thin wall portions 28 is approximately the same as the width of the body engaging portion 15. Further, an engaging hole 29 is located at the center of the rear end portion of the baffle plate 27.

Engaging protrusion 30 extends from an outer surface of the outer circumferential wall 18 to below the body engaging portion 15. The engaging protrusion 30 has a head 30*a*, the diameter of which is somewhat larger than that of other portions.

The baffle plate 27 is preferably bent 90 degrees at the thin wall portions 28. The rear end portion of the baffle plate 27 is placed on a lower end face of the outer circumferentiai wall 18 of the body engaging portion 15. This results in the engaging hole 29 of the baffle plate 27 engaging with the engaging protrusion 30. Accordingly, the baffle plate 27 is fixed, and a squarely cylindrical wind guide path 31 is formed. The wind guide path 3 communicates with the outer opening 26*a* of the ventilation pipe 26, and is open in the transverse direction. In addition, cover wall 32 protrudes backward from a position immediately above the ventilation pipe 24 on the back wall 16.

The socket cover 13, described above, is attached to the lamp body 2. That is, the body engaging portion 15 is engaged with the outside of the surrounding wall 8, and the electric bulb engaging portion 14 is engaged with the outside of the base 7 of the light source bulb 6. Simultaneously, the rear end of the surrounding wall 8 is engaged with the engaging groove 20 of the body engaging portion 15. In addition, the engaging edges 10 of the surrounding wall 8 are located at the rear of the engaging claw 21 of the socket cover 13 such that the surrounding wall 8 is engaged with the engaging claw 21. Due to the engagement described above, it is difficult for the socket cover 13 to separate from the surrounding wall 8.

When the protrusions 17 of the electric bulb engaging portion 14 elastically come into contact with the outer circumferential surface of the base 7 of the light source bulb 6, the ends of the protrusions are crushed. Further, when the protrusions 22 of the body engaging portion 15 elastically come into contact with the outer circumferential surface of the surrounding wall 8, the ends of the protrusions are also crushed. These crushed protrusions provide a substantially waterproof seal.

Thus, the lighting fixture space 33 formed by the lamp body 2 and the lens 4 communicates with the outside through the slits 9 formed in the lamp body 2, the ventholes 23, 25 of the socket cover 13, the ventilation pipes 24, 26, and the wind guide path 31.

Accordingly, when the light source bulb 6 is turned on and air in the lighting fixture space 33 is heated, air convection air is generated in the lighting fixture space 33. By virtue of the air convection action, the outside air is introduced into the lighting fixture space 33 through the wind guide path 31, the ventilation pipe 26, and the suction hole 25. This is followed by the discharge of air introduced into the lighting fixture space 33 through the exhaust hole 23 and the ventilation pipe 24. Since the air in the lighting fixture space 33 is made to flow in this manner, it is possible to prevent misting of the reflecting surface and the lens by moisture when the electric bulb is turned on, or alternatively, misting present on the reflecting surface or on the lens quickly evaporates.

In the head lamp 1 for automobile use described above, the engaging edges 10, which are the means for positively attaching the socket cover 13 to the lamp body 2, can be formed simultaneously with the molding of the lamp body 2. This eliminates the necessity of performing an additional process following molding of the lamp body 2, resulting in reduced manufacturing costs as compared to processes employed prior to the present invention.

As described above, the reflecting surface inside the lamp body 2 is divided into two portions 12*a* and 12*b*, the boundary of which is composed of the slits 9. The focal distances of the two portions 12*a*, 12*b* differ from each other. Accordingly, views of the two reflecting surfaces 12*a*, 12*b* differ from each other and, in addition, the slits 9 are not noticeably when viewed from the front.

FIGS. 12 and 13 are views showing the second embodiment of the lighting fixture for automobile use according to the present invention. Differences between the second embodiment and the first embodiment are described as follows: ribs are formed on the surrounding wall of the lamp body; a partial inner wall is formed instead of the inner circumferential wall on the socket cover; and positioning protrusions are formed on the socket cover.

In the second embodiment, the rear end of the surrounding wall 8A formed on the back of the lamp body 2 includes engaging edges 34 which protrude inward above the center of the surrounding wall and at diagonally lower positions, Each engaging edge 34 includes an inclined face 34*a*, which is located at the rear of the surrounding wall 8A displaced toward the center of the surrounding wall 8A and, in addition, an engaging face 34*b*, which is disposed substantially perpendicular to the axis of the surrounding wall 8A.

Ribs 35 connect the inner edge of the surrounding wall 8A along both edges of the slits 9 in the longitudinal direction to the outer edge of the lamp body 2, the position at which the electric bulb attaching hole 5 is formed.

The body engaging portion 15 of the socket cover 13A includes arcuate inner walls 36 and an outer circumferential wall 18. The inner walls 36 are formed at positions corresponding to the formation positions of the engaging edges 34. The length of the inner walls 36 is approximately half of the length of the outer circumferential wall 18. Between the outer circumferential wall 18 and the inner walls 36 are engaging grooves 37 which are open to the front.

At the front end portions of the inner walls 36 are engaging claws 38. Each engaging claw 38 includes an inclined face 38*a* and an engaging face 38*b* which extends to the rear end of the inclined face 38A.

The baffle plate 39 extends in the longitudinal direction. Thin wall portions 40 are formed at a position where the baffle plate 39 comes into contact with the back of the ventilation pipe 26. At the thin wall portions 40, the baffle plate 39 is bent into a C-shape. The fore end-portion of the baffle plate is affixed to the outer surface of the outer circumferential wall 18. In this manner, the wind guide path 41 is formed. This results in a socket cover 13A lacking an engaging protrusion for fixing the baffle plate, as with the socket cover 13 of the first embodiment.

The second embodiment also includes positioning protrusions 42 on the outer surface of the outer circumferential wall 18. The back of the lamp body 2 includes a substantially arcuate protective wall 43 that surrounds the surrounding wall 8A, except for the lower portion, and the distance of protrusion of the protective wall 43 is approximately half of that of the surrounding wall 8A. The portions 43*a* on the protective wall 43 include recesses that are open in the direction of the center of the socket cover 13A and correspond to the positioning protrusions 42.

The socket cover 13A is attached to the lamp body 2 in the following manner:

The socket cover 13A is pushed forward such that the body engaging portion 15 engages with the outside of the surrounding wall 8A, and the electric bulb engaging portion 14 engages with the outside of the base 7 of the light source bulb 6. Positioning can therefore be easily made when the positioning protrusions 42 are set in accordance with the portions 43*a* on the protective wall 43.

The inclined surface 38*a* of the respective engaging claw 38 on the inner wall 36 comes into contact with the inclined surface 34*a* of the respective engaging edge 34. When the socket cover 13A is further pushed into the lamp body 2, the engaging claw 38 is bent inwardly. When the bent claw exceeds the engaging edge 34, the inwardly bent engaging claw 38 returns to the initial position so that the engaging surface 38*b* of the engaging claw 38 can engage with the engaging surface 34*b*. The rear end portion of the surrounding wall 8A is engaged with the engaging groove 37 of the body engaging portion 15. In this manner, the socket cover 13A is attached to the surrounding wall 8A of the lamp body 2.

When the socket cover 13A is attached to the lamp body 2, the surrounding wall 8A is interposed between the outer circumferential wall 18 and the inner walls 36 and the engaging surfaces 38*b* are engaged with the engaging surfaces 34*b* of the engaging edges 34, Accordingly, the socket cover 13A can be stably attached to the lamp body 2. This arrangement eliminates the possibility that the socket cover 13A will disconnect from the lamp body 2.

The formation of the ribs 35 on the surrounding wall 8A enhances the structural strength of the surrounding wall 8A. When the socket cover 13A is attached to the surrounding wall 8A, the ribs 35 come into contact with both end portions of the inner wall 36 in the circumferential direction and the socket cover 13A is rotated with respect to the surrounding wall 8A. In this manner, the engaging claws 38 are prevented from disconnecting from the engaging edges 34.

It will be apparent to those skilled in the art that various modifications and variations can be made in the lighting fixture for automobile use of the present invention without departing from the spirit or scope of the invention. Thus, it is intended that the present invention cover the modifications and variations of the invention provided they come within the scope of the appended claims and their equivalents.

What is claimed is:

1. A lighting fixture for automobile use comprising:

a lamp body having a front face and a rear portion;

a lens connected to the lamp body for covering the front face of the lamp body;

an electric bulb attached to the rear portion of the lamp body to provide a source of light;

a socket cover attached to the rear portion of the lamp body;

a surrounding wall located proximate to the rear portion of the lamp body, the surrounding wall being engaged with the socket cover and including a plurality of slits arranged along an edge of the surrounding wall; and engaging edges protruding from the rear portion of the lamp body, the engaging edges having positions and dimensions that correspond to the plurality of slits to allow the engaging edges to be formed simultaneously with the molding of the lamp body:

wherein the dimensions of the engaging edges are the same as those of the slits.

2. The lighting fixture for automobile use according to claim 1, further comprising a body engaging portion formed on the socket cover, the body engaging portion being engaged with the surrounding wall.

3. The lighting fixture for automobile use according to claim 2, further comprising a plurality of engaging claws formed on the body engaging portion, the engaging claws being engaged with the engaging edges.

4. The lighting fixture for automobile use according to claim 2, wherein the body engaging portion includes protrusions that elastically come into contact with, and are crushed against, the outer circumferential surface of the surrounding wall to create a waterproof seal.

5. The lighting fixture for automobile use according to claim 1, further comprising a reflecting surface formed on the inside of the lamp body.

6. The lighting fixture for automobile use according to claim 5, wherein the reflecting surface is composed of a paraboloid portion having a focal distance that is formed at a position inside the slits.

7. The lighting fixture for automobile use according to claim 1, further comprising an electric bulb engaging portion having protrusions that elastically come into contact with, and are crushed against, the outer circumferential surface of a base of the light source bulb to create a waterproof seal.

8. A lighting fixture for automobile use comprising:

a lamp body having a front face and a rear portion;

a reflecting surface formed on the inside of the lamp body;

a lens connected to the lamp body for covering the front face of the lamp body;

an electric bulb attached to the rear portion of the lamp body to provide a source of light;

a socket cover attached to the rear portion of the lamp body;

a surrounding wall located proximate to the rear portion of the lamp body, the surrounding wall being engaged with the socket cover and including a plurality of slits arranged along an edge of the surrounding wall; and engaging edges protruding from the rear portion of the lamp body, the engaging edges having positions and dimensions that correspond to the plurality of slits to allow the engaging edges to be formed simultaneously with the molding of the lamp body;

wherein the reflecting surface is divided into two portions having different focal distances.

9. A lighting fixture for automobile use comprising:

a lamp body having a front face and a rear portion;

a lens connected to the lamp body for covering the front face of the lamp body;

an electric bulb attached to the rear portion of the lamp body to provide a source of light;

a socket cover attached to the rear portion of the lamp body;

a surrounding wall located proximate to the rear portion of the lamp body, the surrounding wall being engaged with the socket cover and including a plurality of Slits arranged along an edge of the surrounding wall;

engaging edges protruding from the rear portion of the lamp body, the engaging edges having positions and dimensions that correspond to the plurality of slits to allow the engaging edges to be formed simultaneously with the molding of the lamp body; and a first venthole and a second venthole formed for permitting the ventilation of a lighting fixture space.

10. The lighting fixture for automobile use according to claim 9, further comprising a first ventilation pipe connected to the first venthole to permit the ventilation of the lighting fixture space.

11. The lighting fixture for automobile use according to claim 9, further comprising a second ventilation pipe connected to the second venthole to permit the ventilation of the lighting fixture space.

12. The lighting fixture for automobile use according to claim 9, wherein the electric bulb creates heat convection to assist the ventilation of a lighting fixture space.

13. A surrounding wall for an automobile lighting fixture lamp body, comprising:

an inner and outer edge portion;

a plurality of slits arranged along either edge portion of the surrounding wall;

a rear end portion;

a plurality of engaging edges protruding from the rear end portion, the engaging edges having positions and dimensions that correspond to the plurality of slits to allow the engaging edges to be formed simultaneously with the molding of the lamp body;

wherein the dimensions of the engaging edges are the same as those of the slits.

14. The surrounding wall according to claim 13, wherein the slits are formed at positions along the inner edge of the surrounding wall.

15. The surrounding wall according to claim 13, wherein the engaging edges protrude from the rear end portion of the surrounding wall.

16. The surrounding wall according to claim 13, further comprising a plurality of ribs formed on the surrounding wall to brace the surrounding wall.

* * * * *